United States Patent [19]

Penney

[11] Patent Number: 4,829,366

[45] Date of Patent: May 9, 1989

[54] METHOD AND APPARATUS FOR MEASURING DELAY AND/OR GAIN DIFFERENCE USING TWO DIFFERENT FREQUENCY SOURCES

[75] Inventor: Bruce J. Penney, Portland, Oreg.

[73] Assignee: Tektronix, Inc., Beaverton, Oreg.

[21] Appl. No.: 722,943

[22] Filed: Apr. 12, 1985

[51] Int. Cl.[4] .............................. H04N 17/02
[52] U.S. Cl. .................. 358/10; 324/83 R; 324/88
[58] Field of Search .............. 358/10; 324/79, 83 A, 324/83 R, 88; 455/67

[56] References Cited

U.S. PATENT DOCUMENTS

| | | | |
|---|---|---|---|
| 2,333,322 | 11/1943 | Levy | 324/88 |
| 3,250,853 | 5/1966 | Loughlin | 324/79 R |
| 3,427,541 | 2/1969 | Middleton | 324/88 |
| 3,441,843 | 4/1969 | Wainwright | 324/88 |
| 3,706,931 | 12/1972 | Subramanian | 324/83 X |
| 3,986,113 | 10/1976 | Vifran | 324/79 R |

FOREIGN PATENT DOCUMENTS 506833 12/1954 Italy .......................... 324/88

*Primary Examiner*—John W. Sheppard
*Attorney, Agent, or Firm*—Francis I. Gray; John Smith-Hill

[57] ABSTRACT

The relative gain and/or delay of two signal transmission channels may be measured by impressing on each channel a repetitive signal comprising a burst packet. The burst packets of the signals applied to the channels are of constant, but different, frequencies, and their amplitudes are related in predetermined manner. The two burst packets are timed to have a predetermined phase relationship at a selected time during the packets. The output signals of the two channels are additively combined, and a determination is made as to at least one of (a) the amplitude of the combined signal at a turning point in the amplitude of the signal envelope and (b) the time relative to the selected time at which a turning point in the amplitude of the signal envelope occurs.

6 Claims, 2 Drawing Sheets

METHOD AND APPARATUS FOR MEASURING DELAY AND/OR GAIN DIFFERENCE USING TWO DIFFERENT FREQUENCY SOURCES

This invention relates to a method and apparatus for measuring delay and/or gain difference.

BACKGROUND OF THE INVENTION

It is conventional in the color television field for the color video signal to be processed in encoded (e.g. NTSC) form. Although component signals (generally R, G, B) are produced in cameras and telecines, it has hitherto been usual to encode these component signals and carry out further operations on the encoded signal. Recently, however, the use of component signals (R, G, B or luminance, and two color difference components) has increased, with the result that the need for accurately identifying different characteristics (among them gain and delay) of the channels through which the component signals pass has arisen. It will be understood that unless the gain and delay of the channels are equal, when the components are encoded and the encoded signal is used by a television display, the picture produced by the encoded signal on the television display will not be an accurate representation of the original scene.

The need to provide for accurate measurement of the characteristics of the different channels of a component video system was discussed at International Broadcasting Conference which took place at Brighton, England in September, 1984. In the paper "Measurements in a Television Component Environment" by A. James and P. J. Marshall, mention is made of the use of a 500 kHz sine wave for measuring delay difference among the channels. This measurement is carried out by impressing a 500 kHz signal on the channels, two at a time, and observing on a dual trace oscilloscope whether the zero crossing points of the output sine waves are aligned. This type of measurement, however, is rather difficult to carry out, and, in any event, does not provide an accurate indication of gain difference.

SUMMARY OF THE INVENTION

In accordance with the present invention, differences in delay and/or gain between two signal transmission channels are measured by impressing on each channel a repetitive signal comprising a burst packet. The two burst packets are of different predetermined frequencies and are timed to have a predetermined phase relationship at a selected time during each burst packet. The two signals that have been transmitted through the signal transmission channels respectively are additively combined, and, depending upon whether it is the gain or delay of the channels that is to be measured, the amplitude of the combined signal at a turning point in the amplitude of the signal envelope, or the difference, if any, between the selected time (at which the packets have the predetermined phase relationship) and the time at which a turning point in the amplitude of the envelope occurs, is measured.

In the case of a component video system, the burst packets occur at line rate and the two signals are synchronized so that the burst packets are in phase at the midpoint of the line. The output signals are subtracted and the difference signal is displayed on an oscilloscope, or the output signals are applied to the A and B terminals of a waveform monitor in the A-B mode. If the two channels are of equal delay and gain, the envelope signal will have zero amplitude at the midpoint of the line. If the gains are unequal, the turning point of the envelope amplitude will occur at a finite value of the envelope amplitude, and if the delays are different the turning point of the envelope amplitude will be displaced from the midpoint of the line.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
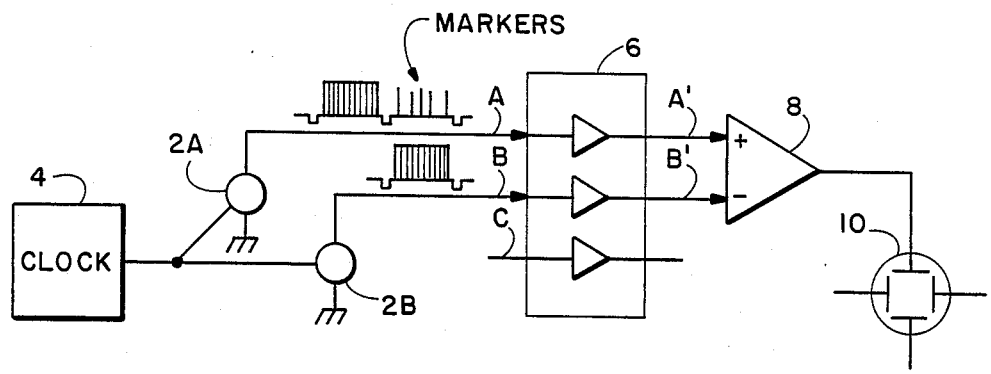
FIG. 1 is a block diagram illustrating a measurement system embodying the present invention.

The measurement system illustrated in FIG. 1 comprises a pair of video signal generators 2A and 2B. The two video signal generators are digital, each comprising a PROM that is programmed to produce a predetermined signal when the PROM is addressed. The two video signal generators 2A and 2B receive their clocks from a common master clock generator 4. The signal generated by each generator repeats at video line rate and includes a blanking interval and a full line burst packet on a pedestal. The two burst packets are at slightly different frequencies (e.g. 500 kHz and 502 kHz) and are timed to be in phase in the middle of the video line. The two test signals are applied to the inputs A and B of two of the three channels of an analog component video system 6, and the signals at the outputs A' and B' are applied to respective inputs of a subtraction amplifier 8 that combines the signals in additive fashion. The output of the amplifier 8 is applied to the vertical input of a waveform monitor or other suitable display device, such as an oscilloscope.

Figure 2:
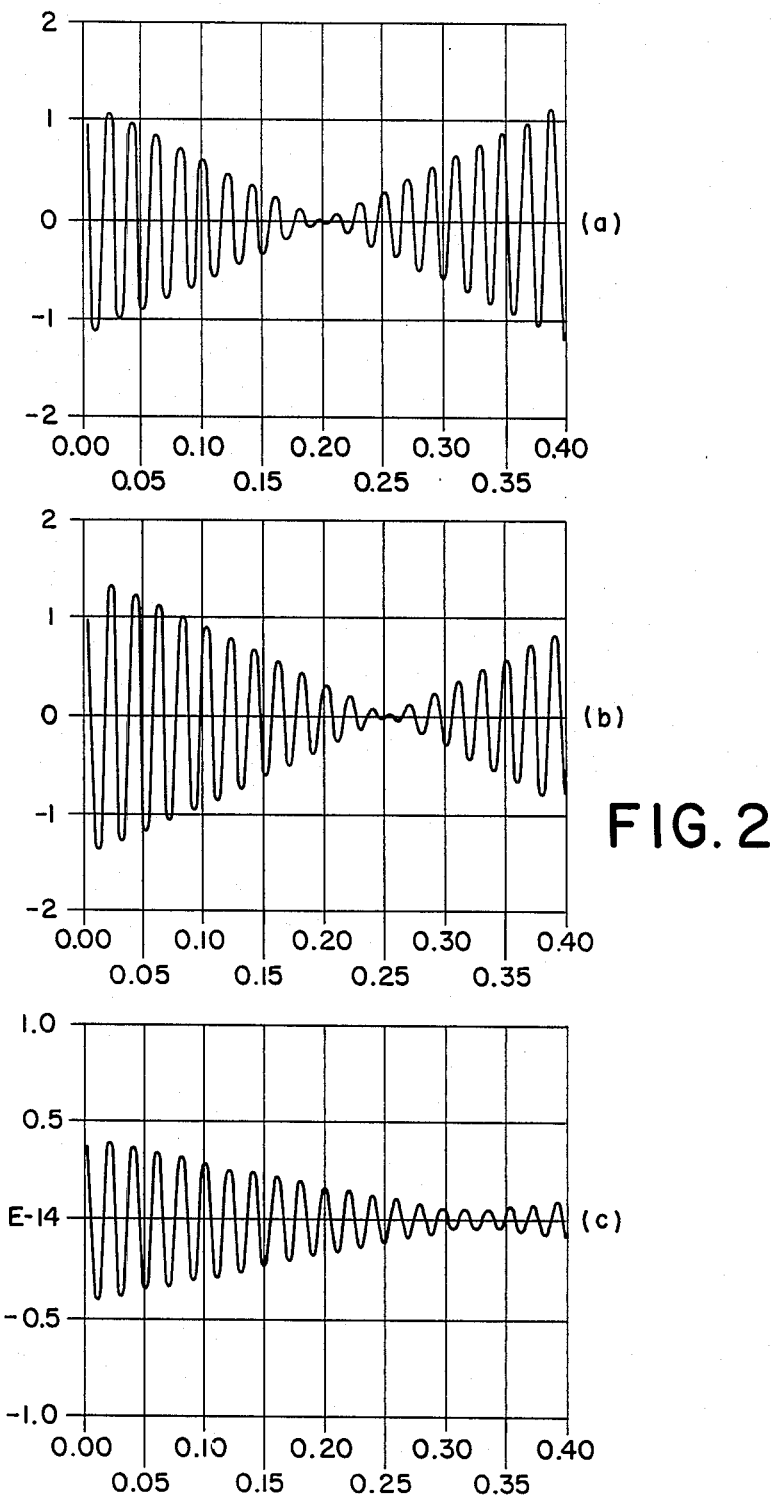
FIG. 2 shows signal waveforms provided by the system under three different conditions.

The type of display provided on the waveform monitor is shown in FIG. 2. FIG. 2(a) shows the display that is obtained when the burst packets are at 500 kHz and 510 kHz and there is no gain or delay difference between the two channels. The envelope of the combined signal then has zero amplitude at the midpoint of the horizontal line. In the case of FIG. 2(b) the burst packets are at 500 kHz and at 510 kHz, and again the envelope of the combined signal has a point of zero amplitude, but this is spaced from the midpoint of the line, implying a delay difference between the channels.

It can be shown that if the frequencies of the packets are $f_o$ and $f_o+\Delta f$, and the sweep rate of the display is T s/div, and $\Delta f$ is small in relation to $f_o$, then the delay calibration that relates the position of the point of minimum amplitude of the signal envelope to the position of that point if there were no relative delay is $T\,\Delta f/f_o$ s/div. In the displays shown in FIG. 2, T is 5 μs/division and this corresponds, in the case of FIGS. 2(a) and 2(b) to approximately 100 ns delay per division.

FIG. 2(c) shows the display that is obtained with signals of 500 kHz and 502 kHz. This results in a calibration of about 20 ns delay per division. In the case of FIG. 2(c), the two signals do not cancel completely, and accordingly the envelope has non-zero amplitude at its minimum amplitude point. In this particular case, the amplitude of the envelope at its minimum amplitude point represents a gain difference of about 5%. The minimum amplitude point is spaced from the midpoint of the line by about two and one-half divisions, corresponding to a delay of 50 ns between the channels.

In the event that the component signals passed through the three channels of the video system 6 are a luminance component and two color difference components, the blanking interval for the luminance component would include a horizontal sync pulse but it would not be necessary to include a horizontal sync pulse in the blanking intervals for the color difference components.

It will be appreciated that the invention is not restricted to the particular method and apparatus that have been described, and that variations may be made therein without departing from the scope of the invention as defined in the appended claims, and equivalents thereof. For example, although the output signals from the two channels are subtracted in the case of the illustrated system, if the signals were arranged to be precisely out of phase at a predetermined point of the line, cancellation of the signals would be brought about by addition. In order to facilitate display, one of the test signals could include markers (see FIG. 1) that are spaced apart along the line and provide the timing calibration independently of the calibration of the display. Markers of different height could be employed to provide a calibration of gain difference.

I claim:

1. A method of measuring relative delay and/or gain of first and second signal transmission channels, comprising impressing on the first channel a first repetitive signal that comprises a burst packet at a first predetermined frequency, impressing on the second channel a second repetitive signal that comprises a burst packet at a second predetermined frequency, different from the first predetermined frequency and of an amplitude that bears a predetermined relationship to the amplitude of the burst packet of the first repetitive signal, the two burst packets being timed to have a predetermined phase relationship at a selected time during the respective packets, additively combining the signals at the outputs of the first and second channels, and determining at least one of (a) the amplitude of the combined signal at a turning point in the amplitude of the signal envelope and (b) the time relative to said selected time at which a turning point in the amplitude of the signal envelope occurs.

2. A method according to claim 1, wherein the amplitudes of the bursts of the first and second repetitive signals are equal, and the step of additively combining the output signals of the first and second channels is accomplished by subtracting one of the output signals from the other output signal.

3. A method according to claim 1, wherein one of said first and second repetitive signals includes at least one marker for indicating at least one of (a) the amplitude of the combined signal at said turning point and (b) the time relative to said selected time at which said turning point occurs.

4. A method according to claim 1, wherein said signal transmission channels are channels of an analog component video equipment, and each of said first and second repetitive signals repeats at the line rate established for the video equipment and includes a horizontal blanking interval.

5. Apparatus for measuring relative delay and/or gain between two signal transmission channels, comprising first means for generating and impressing on the first channel a first repetitive signal comprising a burst packet at a first predetermined frequency, second means for generating and impressing on the second channel a second repetitive signal comprising a burst packet at a second predetermined frequency, different from the first predetermined frequency and of an amplitude that bears a predetermined relationship to the amplitude of the burst packet of the first repetitive signal, the two burst packets being timed to have a predetermined phase relationship at a selected time during respective packets, and means for additively combining the signals provided at the outputs of the first and second channels respectively, whereby a determination may be made as to at least one of (a) the amplitude of the combined signal at a turning point in the amplitude of the signal envelope and (b) the time relative to said selected time at which a turning point in the amplitude of the signal envelope occurs.

6. Apparatus according to claim 5, wherein said first means and said second means are such that the amplitudes of the first and second burst packets are equal and the two burst packets are timed to be in phase at said preselected time, and the means for additively combining the output signals comprise means for subtracting one of the output signals from the other output signal.

* * * * *